United States Patent
Zeng et al.

(10) Patent No.: US 10,949,532 B2
(45) Date of Patent: Mar. 16, 2021

(54) SYSTEM AND METHOD FOR MONITORING FILE INTEGRITY OF MULTIPLE CONTAINERS USING ONE AGENT

(71) Applicants: Beijing Jingdong Shangke Information Technology Co., Ltd., Beijing (CN); JD.com American Technologies Corporation, Mountain View, CA (US)

(72) Inventors: Junyuan Zeng, Mountain View, CA (US); Zhenxin Zhan, Mountain View, CA (US); Yuan Chen, Mountain View, CA (US); Jimmy Su, Mountain View, CA (US)

(73) Assignees: Beijing Jingdong Shangke Information Technology Co., Ltd., Beijing (CN); JD.com American Technologies Corporation, Mountain View, CA (US)

( * ) Notice: Subject to any disclaimer, the term of this patent is extended or adjusted under 35 U.S.C. 154(b) by 236 days.

(21) Appl. No.: 16/218,625

(22) Filed: Dec. 13, 2018

(65) Prior Publication Data
US 2020/0193016 A1 Jun. 18, 2020

(51) Int. Cl.
*G06F 21/53* (2013.01)
*G06F 21/56* (2013.01)
(Continued)

(52) U.S. Cl.
CPC .......... *G06F 21/53* (2013.01); *G06F 9/45558* (2013.01); *G06F 9/54* (2013.01);
(Continued)

(58) Field of Classification Search
CPC .... G06F 9/45558; G06F 21/53; G06F 21/565; G06F 21/64; G06F 2209/542;
(Continued)

(56) References Cited

U.S. PATENT DOCUMENTS 7,069,594 B1  6/2006  Bolin
7,457,951 B1  11/2008  Proudler et al.
(Continued)

FOREIGN PATENT DOCUMENTS

EP  2228722 B1  11/2011
KR  101002754 B1  12/2010

OTHER PUBLICATIONS http://man7.org/linux/man-pages/man7/namespaces.7.html, 2014.
(Continued)

*Primary Examiner* — Bryan F Wright
(74) *Attorney, Agent, or Firm* — China Science Patent & Trademark US LLC

(57) ABSTRACT

A system for monitoring file integrity in a host computing device having a process and a storage device storing computer executable code. The computer executable code is configured to: provide containers, an agent external to the containers, and a policy file configuring policy for the containers; intercept a system call indicating mounting, and construct a first correspondence between a container file path and a host file path having mounting correspondence; intercept a system call of the container indicating opening of the policy file, and construct a second correspondence between the container file path and the violation of the container file path; aggregate the first and second correspondences to obtain a correspondence between the host file path and the violation; and monitor file integrity of the container by detecting violation of the host file path.

20 Claims, 9 Drawing Sheets

(51) Int. Cl.
  *G06F 21/64* (2013.01)
  *H04L 12/24* (2006.01)
  *G06F 9/455* (2018.01)
  *G06F 9/54* (2006.01)

(52) U.S. Cl.
  CPC ............ *G06F 21/565* (2013.01); *G06F 21/64* (2013.01); *H04L 41/0893* (2013.01); *G06F 2009/45562* (2013.01); *G06F 2009/45587* (2013.01); *G06F 2009/45591* (2013.01); *G06F 2209/542* (2013.01)

(58) Field of Classification Search
  CPC . G06F 2009/45587; G06F 2009/45562; H04L 63/20; H04L 41/0893; G96F 2009/45591
  USPC .......................................................... 726/22
  See application file for complete search history.

(56) References Cited

U.S. PATENT DOCUMENTS

| | | | |
|---|---|---|---|
| 7,526,516 | B1 | 4/2009 | Pavlyushchik |
| 8,819,225 | B2 | 8/2014 | Wang et al. |
| 2005/0060722 | A1* | 3/2005 | Rochette .................. G06F 8/60 719/319 |
| 2006/0090193 | A1* | 4/2006 | Johnson .................. H04L 63/04 726/1 |
| 2007/0028291 | A1* | 2/2007 | Brennan .................. H04L 63/20 726/1 |
| 2007/0299806 | A1* | 12/2007 | Bardsley ............... G06F 16/164 |
| 2016/0335429 | A1* | 11/2016 | Smith ..................... G06F 21/57 |
| 2018/0260574 | A1* | 9/2018 | Morello ................ G06F 21/577 |
| 2018/0293394 | A1* | 10/2018 | Gunda ................ G06F 9/45558 |
| 2018/0309747 | A1* | 10/2018 | Sweet ..................... H04L 63/20 |
| 2019/0036978 | A1* | 1/2019 | Shulman-Peleg ....... G06F 21/53 |
| 2019/0332777 | A1* | 10/2019 | Edwards ................. G06F 21/57 |

OTHER PUBLICATIONS https://www.linux-kvm.org/page/Main_Page, 2015.
https://www.xenproject.org, 2018.
https://www.virtualbox.org/, 2011.
https://www.vmware.com/products/esxi-and-esx.html, 2018.
https://microservices.io/patterns/microservices.html, 2014.
https://aws.amazon.com/serverless/, 2017.
https://www.datamation.com/cloud-computing/aws-vs.-azure-vs.-google-cloud-comparison.html, 2017.
https://coreos.com/clair/docs/latest/, 2016.
https://docs.docker.com/engine/security/seccomp/, 2017.
https://cloudplatform.googleblog.com/2018/05/Open-sourcing-gVisor-a-sandboxed-container-runtime.html, 2018.
https://docs.docker.com/engine/security/apparmor/, 2016.
Kalev Alpernas et al., Secure serverless computing using dynamic information flow control, 2018, arXiv:1802.08984.

* cited by examiner

Global Variable:

*con_process* ← Set().init(*con_root*.pid): a set of processes related to container creation and it is initialized with the root processes of container (e.g. *dockerd* for docker container);

*pid_cid* ← Dict(): a dictionary for mapping a process ID to a container ID;

INPUT: *syscall*
```
01  if syscall.type == PROCESS_CREATION:
02      if syscall.caller.pid.parent ∈ con_process AND is_descendant (con_root.pid):
03          con_process.add(syscall.caller.pid)
04  elif syscall.type == PROCESS_TERMINATION:
05      if syscall.caller.pid ∈ con_process:
06          con_process.remove(syscall.caller.pid)
07          pid_cid.remove(syscall.caller.pid)
08  elif syscall.caller.pid ∈ con_process:
09      if (syscall.type == FILE_OPEN AND is_policy_file(syscall.args.file))
10         OR (syscall.type == FILESYSTEM_MOUNT):
11          if syscall.caller.pid ∈ pid_cid.keys:
12              cid ← pid_cid[syscall.caller.pid]
13          else:
14              cid ← generate_cid(256)
15              pid_cid[syscall.caller.pid] ← cid
16          if syscall.type == FILE_OPEN:
17              Dispatch_Parser(cid, syscall.args.file)
18          elif syscall.type == FILESYSTEM_MOUNT:
19              Dispatch_Mapper(cid, syscall.args.mount)
```

FIG. 6A

```
01 SaveToDB(cid, type, base, h_path, c_path):
02     prefix ← common_prefix(base,h_path)
03     path ← str_replace(h_path, 0, len(prefix), c_path)
04     SaveDB(cid, type, h_path, path)

INPUT: cid, mount
05  if mount.type == OVERLAY:
06     record ← < ContainerId=cid, type=BASE, HostPath=mount.dst.fullpath, ContainerPath= "/" >
07     SaveToDB(record.cid, MAPPED, record.HostPath, record.HostPath, record.ContainerPath)
08  elif mount.type == BIND:
09     base ← LookupDB(ContainerId=cid, type=BASE)
10     if not_exist(base):
11         throw exception
12     SaveToDB(cid, MAPPED, base.HostPath, mount.dst.fullpath, base.ContainerPath)
13  else:
14     do_nothing
```

FIG. 6B

```
INPUT: cid, file
01 foreach rule in open(file):
02   record ← <containerId=cid, type=RULE, ContainerPath, Violation> ← format(cid, rule)
03   if record.CotainerPath.isDir():
04       foreach file in record.ContainerPath:
05           SaveDB(<record.cid, record.type, file.path, record.Violation>)
06   else:
07       SaveDB(record)
```

FIG. 6C

```
01 for each cid in DB:
02   rule  lookupDB(cid, type=RULE)
03   if rule.ContainerPath.isDir():
04       foreach file in rule.ContainerPath:
05           Mapper  lookupDB(cid, type=MAPPED, file.path)
06           SaveDB(<cid, type=FIM, Mapper.HostPath, Mapper.ContainerPath, rule.Violation>)
07   else:
08       Mapper  lookupDB(cid, type=MAPPED, rule.ContainerPath)
09       SaveDB(<cid, type=FIM, Mapper.HostPath, Mapper.ContainerPath, rule.Violation>)
```

FIG. 6D

SYSTEM AND METHOD FOR MONITORING FILE INTEGRITY OF MULTIPLE CONTAINERS USING ONE AGENT

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present disclosure relates generally to the field of information security, and more particularly to a system and method for File Integrity Monitoring (FIM) of containers using one agent.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

File Integrity Monitoring (FIM) is a behavior of validating integrity of a file system (including an Operating System (OS), software, configuration files and credential files etc.) between the current state and a desired state in order to detect invalid modification, deletion, replacement and so on, which can effectively detect illegitimate actions performed by a regular hack or common malware (Trojan, Rootkit, etc.). For example, Advanced Persistent Threat (APT), such as Government sponsored cyber-espionage can be detected by well-designed FIM policy. Specifically, for persistent attack, APT malware needs to modify OS credentials (e.g., .ssh/id_rsa.pub./etc/shadow, /usr/bin/passwd etc. on Linux) or hide itself in the target machine by replacing a vanilla binary with a malicious one (e.g., ps, ls, ifconfig etc.) or by deleting logging information /etc/localtime or bash history .bash_history, and FIM policy can be configured to detect those modifications or deletions.

FIM is implemented by a software system, such as an agent, running on a host system (also referred to as a host-based system) of a computing device (e.g., a host) using an FIM policy. The FIM policy is usually specified by a user, such as a system administrator, via a file structure to define violation actions(s) related to the files and/or the paths of the files, and the detection of the violations leads to an alert for file integrity. For example, the FIM policy is represented by a list of rules which can be formalized as <file, violation>, where file refers to a full file path which may be understood by the host to find the corresponding file stored in the file path, and violation indicates action(s) that would break file integrity. For instance, </bin/ls, 'w, d'> means that if the file in the path /bin/ls is modified or deleted, it will trigger an alert for file integrity. For example, EP 2228722 B1, U.S. Pat. No. 7,526,516 B1, KR 20100125116 A, U.S. Pat. Nos. 7,457,951 B1, 7,069,594 B1, 8,819,225 B2 ([14]-[19]) etc. have described how the FIM is performed on the host.

Currently, a container, as a lightweight virtualization technique providing a virtual host environment for applications, is playing a more and more important role on a physical machine, such as a host. Different from traditional virtual machines ([2]-[5]), all containers on the physical machine share the same kernel for better resource utilization and efficiency. Thanks to its effectiveness and advantages, the container has been widely adopted in microservices ([6]) and serverless computing architectures ([7]). It has been shown ([8]) that the cloud providers, including Amazon AWS, Google Cloud, Microsoft Azure, use containers as their core techniques. For example, instead of running directly on a host system, e.g., Linux, of a computing device, all of applications may run in a large number, such as hundreds of thousands, of containers which in turn run in the host system, so that the applications running in one container may achieve a relatively secure running environment isolated from others in other containers.

With respect to container security, a virtualized host isolates containers from each other by using Linux namespace abstraction ([1]) technologies. In particular, the abstraction includes inter-process communication (IPC), Network, Mount, process identifier (PID), User and UNIX timesharing system (UTS). Each container has its own userspace, and can only "see" its own file system. The containers are isolated from the host.

Regarding FIM for container, Mount provides a virtual view of a file system for each container although the same file path may refer to different real files stored on the host. As shown in FIG. 1, Container 1 mounts /mount/bin on the host to /bin in Container 1 and therefore the absolute path /bin in Container 1 points to the path /mount/bin on the host. Similarly, the absolute path /usr/bin in Container 2 points to the path /var/lib/docker/overlay2/fa98b6e93/merged/usr/bin on the host.

Because the file structure of the container-based system is different from that of the traditional host-based system, the existing FIM policies and methods used in the host-based system as previously described do not work anymore for the container-based system.

Therefore, an unaddressed need exists in the art to address the aforementioned deficiencies and inadequacies.

SUMMARY

In certain aspect, the present disclosure relates to a system for monitoring file integrity (FIM) of a plurality of containers in a host computing device. In certain embodiments, the host computing device has a process and a storage device storing computer executable code. The computer executable code, when executed at the processor, is configured to:

provide the containers, an agent external to the containers, and a policy file configuring policy for the containers;

intercept, by the agent, a first system call of one of the containers, the first system call indicating mounting of a container file path onto a corresponding host file path;

construct, by the agent, a first correspondence between the container file path and the host file path;

intercept, by the agent, a second system call of the one of the containers, the second system call indicating opening of the policy file, and the policy file containing the container file path and violation corresponding to the container file path;

construct, by the agent, a second correspondence between the container file path and the violation;

aggregate, by the agent, the first correspondence and the second correspondence to obtain the third correspondence between the host file path and the violation of the container; and monitor, by the agent, file integrity of the container by detecting violation of the host file path in the third correspondence.

In certain embodiments, each of the first correspondence and the second correspondence is identified with an identification of the container (cid), and the first correspondence and the second correspondence are aggregated when they have the same cid.

In certain embodiments, the cid of the first system call is defined based on a process identification (pid) of the first system call, and the cid of the second system call is defined based on a pid of the second system call.

In certain embodiments, at least one of the pid of the first system call and the pid of the second system call is the same as a pid of a process initializing the container.

In certain embodiments, at least one of the pid of the first system call and the pid of the second system call is a descendant of a pid of a process initializing the container.

In certain embodiments, the computer executable code is further configured to: construct a mapping between process identifications and identifications of the containers, such that a pid of a process can be converted to cid of the process based on the mapping.

In certain embodiments, the computer executable code is further configured to: update the policy file using the third correspondence, and monitoring file integrity of the container using the updated policy file.

In certain embodiments, the computer executable code is further configured to, after intercept the second system call and before construct the second correspondence: retrieve policy for the container from the policy file.

In certain aspects, the present disclosure relates to a method for monitoring file integrity of containers in a host computing device. In certain embodiments, the method includes:

providing an agent in the host computing device external to the containers and a policy file configuring policy for the containers;

intercepting, by the agent, a first system call of one of the containers, the first system call indicating mounting of a container file path onto a corresponding host file path;

constructing, by the agent, a first correspondence between the container file path and the host file path;

intercepting, by the agent, a second system call of the one of the containers, the second system call indicating opening of the policy file, and the policy file containing the container file path and violation corresponding to the container file path;

constructing, by the agent, a second correspondence between the container file path and the violation;

aggregating, by the agent, the first correspondence and the second correspondence to obtain the third correspondence between the host file path and the violation of the container; and monitoring, by the agent, file integrity of the container by detecting violation of the host file path in the third correspondence.

In certain embodiments, each of the first correspondence and the second correspondence is identified with an identification of the container (cid), and the first correspondence and the second correspondence are aggregated when they have the same cid.

In certain embodiments, the cid of the first system call is defined based on a process identification (pid) of the first system call, and the cid of the second system call is defined based on a pid of the second system call.

In certain embodiments, at least one of the pid of the first system call and the pid of the second system call is the same as a pid of a process initializing the container.

In certain embodiments, at least one of the pid of the first system call and the pid of the second system call is a descendant of a pid of a process initializing the container.

In certain embodiments, the method further includes: constructing a mapping between process identifications and identifications of the containers, such that a pid of a process can be converted to cid of the process based on the mapping.

In certain embodiments, the method further includes: updating the policy file using the third correspondence, and monitoring file integrity of the container using the updated policy file.

In certain embodiments, the method further includes, after intercepting the second system call and before constructing the second correspondence: retrieving policy for the container from the policy file.

In certain aspects, the present disclosure relates to a non-transitory computer readable medium storing computer executable code. In certain embodiments, the computer executable code, when executed at a processor of a computing device, is configured to perform the method described above.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

FIG. 6A schematically depicts a procedure of performing interception according to certain embodiments of the present disclosure.

FIG. 6B schematically depicts a procedure of performing mapping according to certain embodiments of the present disclosure.

FIG. 6C schematically depicts a procedure of performing parsing according to certain embodiments of the present disclosure.

FIG. 6D schematically depicts a procedure of performing aggregation according to certain embodiments of the present disclosure.

DETAILED DESCRIPTION

Figure 1:
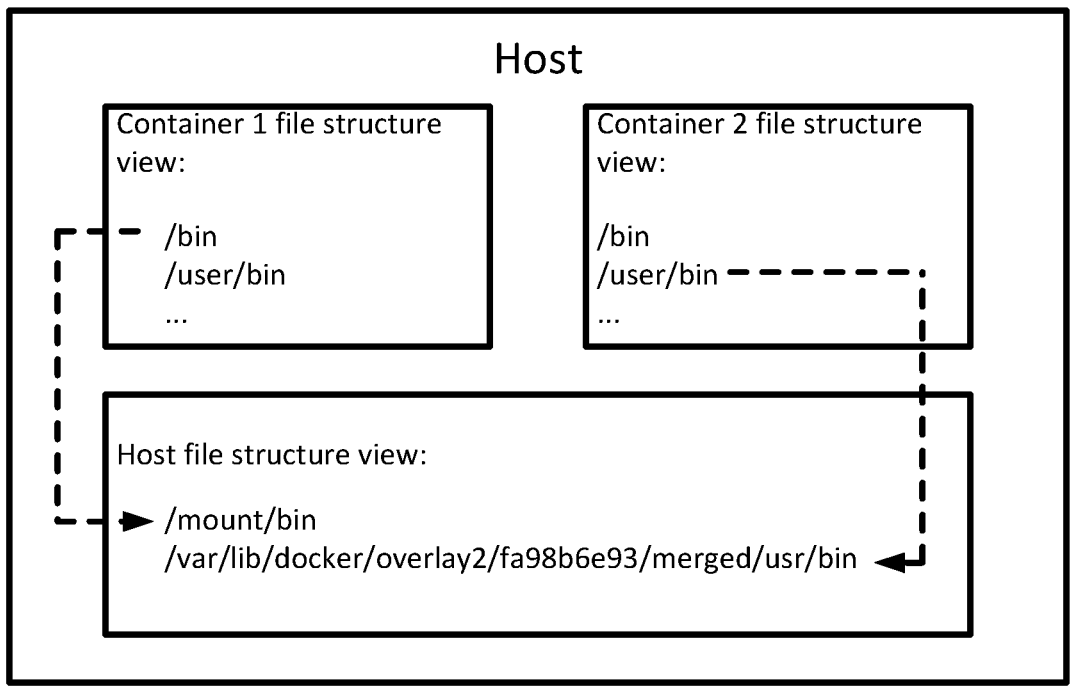
FIG. 1 schematically depicts an example of mounting file paths in containers to file paths on a host in prior art.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Unless otherwise defined, "first", "second", "third" and the like used before the same object are intended to distinguish these different objects, but are not to limit any sequence thereof.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

As used herein, "plurality" means two or more.

As used herein, the terms "comprising", "including", "carrying", "having", "containing", "involving", and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure. As used herein, the term "and/or" includes any and all combinations of one or more of the associated listed items.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

Figure 2:
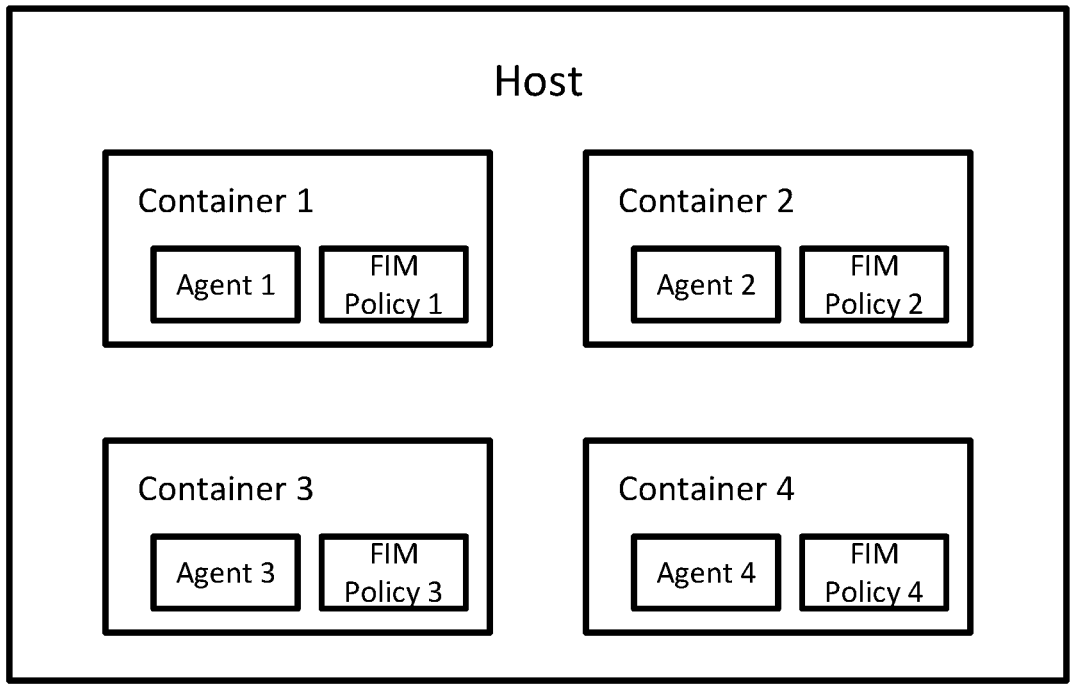
FIG. 2 schematically depicts a file integrity monitoring (FIM) architecture for multiple containers running on a host according to certain embodiments of the present disclosure, where each container is provided with an agent and an FIM policy dedicated to the container.

In certain aspects, the present disclosure provides a strawman architecture as shown in FIG. 2 to perform FIMs for containers, where each container has a respective dedicated agent inside for performing a corresponding FIM policy. Similar to the file structure of the FIM policy for the host-based system, the FIM policy dedicated to the container may be specified by the user via a file structure to define violation action(s) related to the files and/or file paths of the files. The FIM policy specific to the container may be represented by a list of rules which may also be formalized as <file, violation>, where file indicates the file path in the container and violation indicates actions that would break the file integrity.

However, the agent for performing the FIM (also referred to as the FIM agent) in the container only knows the file path in the container, but doesn't know the corresponding host file path outside the container due to the container isolation, and cannot identify the corresponding host file path which was dynamically determined during the mounting of the container.

The above strawman-based technique has at least drawbacks as follows:

(1) It is not secure once the container is compromised;

(2) It requires additional computing resource, since each container requires one copy of agent; and (3) It requires extra management efforts and is not scalable as the number of containers increases.

Figure 3:
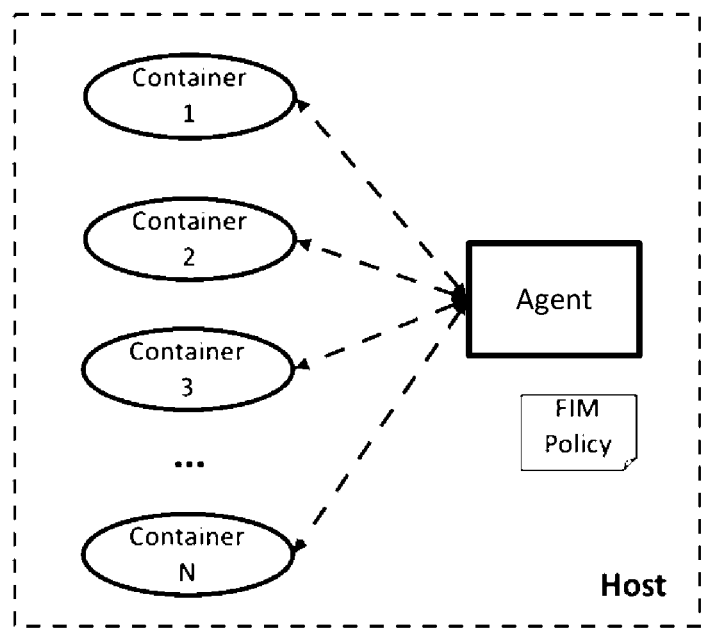
FIG. 3 schematically depicts an FIM architecture for multiple containers running on a host according to a certain embodiment of the present disclosure, wherein an agent is provided outside the containers for performing a centralized FIM of the containers.

As an improvement of performing FIM for containers, in certain aspects, the present disclosure provides a novel centralized FIM architecture for managing a plurality of containers running on a host. As shown in FIG. 3, a plurality of containers 1-N and an agent are both running on a host system of a computing device, and the agent is deployed outside the plurality of containers for monitoring file integrity inside each of the plurality of containers. That is, the present disclosure provides a host-based FIM scheme for a container-based system.

In the container-based system as shown in FIG. 2, the user specifies an FIM policy for a container via a file structure, defining violation action(s) of files and/or file paths in this container, and the FIM policy specific to the container may be represented by a list of rules which may also be formalized as <file, violation>, where violation indicates actions that would break the file integrity, and file refers to a file path in the container (also referred to as a container file path) which may be understood by the agent in the container to find the corresponding file, as previously described. However, the agent which is deployed on the host system according to certain aspects of the present disclosure cannot identify the container file path in the FIM policy specified by the user for the container-based system, but can only understand the host file path, like the agent deployed on the host-based system as previously described. That is, there is a semantic gap between the container and the host, in particular, between the container file path in the FIM policy specified by the user and the host file path which can be understood by the agent deployed on the host system.

Figure 4:
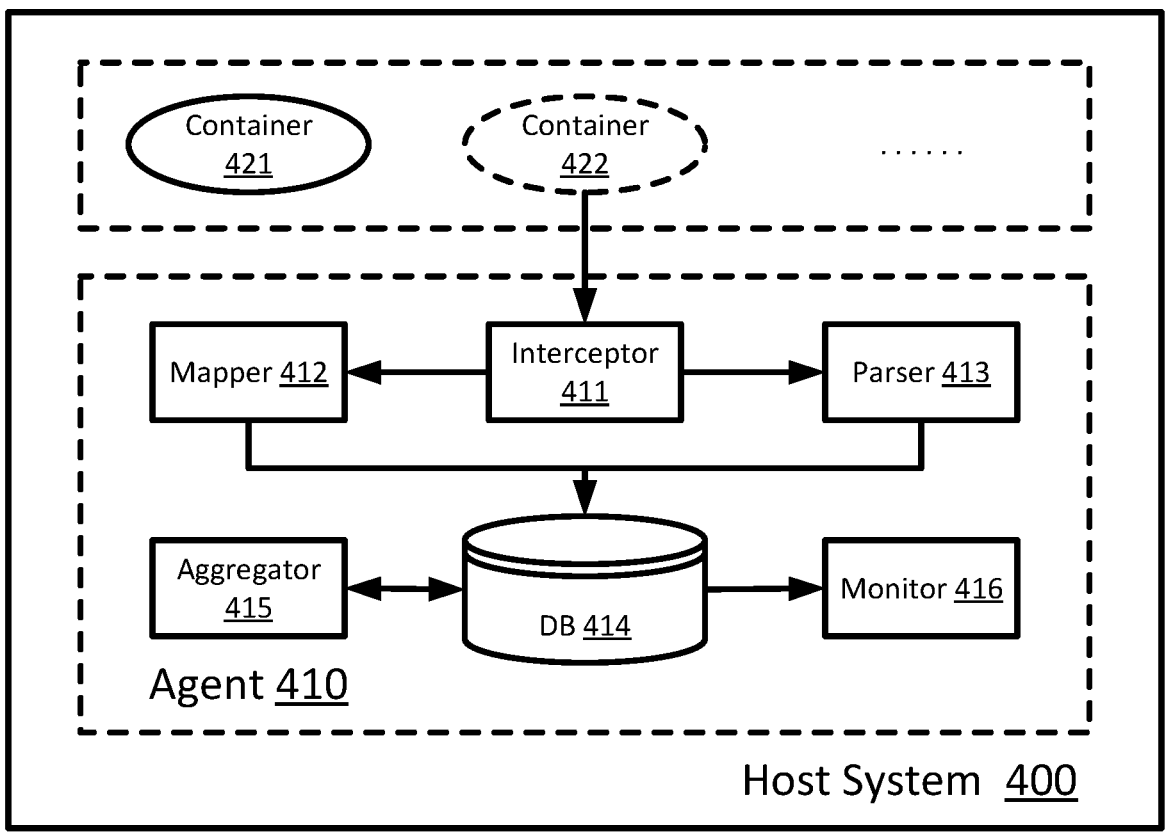
FIG. 4 schematically depicts a structure of a host system having a centralized FIM agent according to certain embodiments of the present disclosure.
Figure 5:
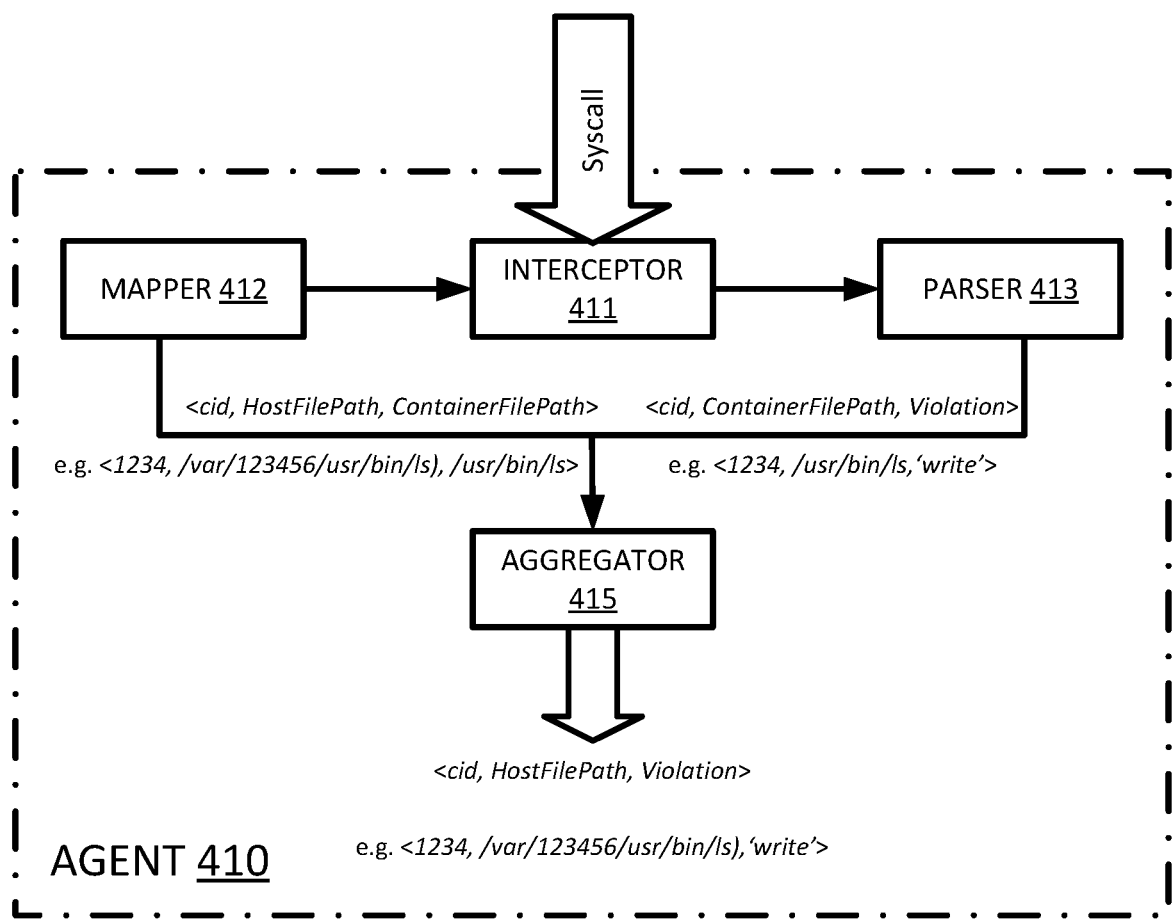
FIG. 5 schematically depicts a process flow of a centralized FIM agent running on the host system of FIG. 4.

In order to implement such a centralized FIM architecture as shown in FIG. 3, the present disclosure provides a method for bridging the semantic gap between the container and the host. FIG. 4 schematically shows a host system running on a computing device that uses one agent to manage FIM of multiple containers, and FIG. 5 shows a workflow in the agent running on the host system of FIG. 4. As shown in FIG. 4, a host system 400 according to certain embodiments of the present disclosure includes a plurality of containers 421, 422, . . . , and an agent 410 deployed outside the plurality of containers. The agent 410 includes an interceptor 411, a mapper 412, a parser 413, a database (DB) 414, an aggregator 415, and a monitor 416. As shown in the overall workflow of FIG. 5, the input for the FIM system is the system call (or syscall) of host operating system. The interceptor would catch two types of syscall: syscall for container file system mounting and for opening a policy file. Those syscalls are then sent to Mapper and Parser to generate: the mapping of host file path and container file path and the mapping of container file path and violation. The former is represented in <cid, HostFilePath, ContainerFilePaht> while the latter is represented in <cid, ContainerFilePath, Violation>. Specifically, (1) cid is the unique ID for each container; (2) HostFilePath is the full path for each file (for example /var/123456/usr/bin/ls) in host; (3) ContainerFilePath is the full path for each file (for example /bin/ls) in container; (4) Violation indicates the actions that break file integrity. Finally, Aggregator joins two mappings using the key cid and ContainerFilePath and then generates the output <cid, HostFilePath, Violation> which can be directly used by host FIM.

Here, the container 421 shown with solid lines intends to exemplarily denote such a kind of container that has been created and is running under the FIM of the agent 410; and the container 422 shown with dashed lines intends to exemplarily denote such a kind of container that is being created, during which the agent 410 acts for bridging the semantic gap between the container and the host, in order to perform the FIM for the container after it is created, like the container 421. As appreciated by the skilled in the art, the current processing of the agent 410 for the container 422 has been performed in the same way for the container 421.

Hereinafter, the operation of the agent 410 for the container 422 will be described in detail in conjunction with FIG. 4 and FIG. 5. It should be understood that the container 422 is described as an example of a container being created; and although the following process is exemplarily described for only one container (e.g., the container 422) being created, it may be appreciated by the skilled in the art that such process is applicable to each of a plurality of containers being created.

The interceptor 411 is configured to intercept system calls of an operating system of the host system 400 and bridges the semantic gap between the container and the host. When a user or manager of the host system 400 initiates to create the container 422 using an instruction, a series of system calls may be detected by the interceptor 411, including not only system calls relevant to the process of creating the container 422, but also system calls irrelevant to the process of creating the container 422, such as system calls of some normal processes. When system calls of creating a process or terminating a process are detected by the interceptor 411, the interceptor 411 determines that a normal process or a container is created.

If the system calls are made by the process of creating the container 422, for example, if a process ID (also denoted as "pid", which is a unique ID for a process) of the process of creating the container 422 is the descendent of root processes for container services, the interceptor 411 determines that the container 422 is created.

Then, if a system call made by the process of creating the container 422 for mounting a file system of the container 422 or a system call made by the same process for opening an FIM policy file of the container 422 is detected by the interceptor 411, the interceptor 411 obtains a container ID (also denoted as "cid", which is a unique ID for a container) of the container 422 based on the process of creating the container 422.

In certain embodiments, the container ID of the container 422 may be generated based on the process ID of the process of creating the container 422. Alternatively, the container ID of the container 422 may be obtained based on the process ID of the process of creating the container 422 and a stored mapping relationship between the process ID and the container ID.

During the creation of the container 422, the file system of the container needs to be mounted to corresponding paths in the host system, and a system call for mounting the file system is generated. When the interceptor 411 detects the system call of file system mounting, the interceptor 411 is configured to obtain the mounting information-including the container ID and the corresponding file paths in the container and the host, and send the mounting information to the mapper 412.

At the same time, during the creation of the container 422, the configuration of the container or a FIM policy corresponding to the container need to be read in, and a system call for opening the FIM policy corresponding to the container is generated. When the interceptor 411 detects the system call of opening the corresponding policy file, the interceptor 411 is configured to obtain the policy file related information, and send the policy file related information to the parser 413. The policy file related information may include id of the container, one or more container file paths, and violations defined for the container file paths.

As shown in FIG. 3, the FIM policy file of the containers is located inside the host and outside the containers. For the many containers, there maybe one or several FIM policy files. If there is only one policy file, the one policy file includes policies for all the containers. If there are several policy files, the several policy files may each correspond to a category of containers that have similar policies. The FIM policy specific to the container may be represented by a list of rules which may be formalized as <file, violation>, where file refers to a file path in the container, and violation indicates an action that would break the file integrity of the file.

In certain embodiments, the interceptor 411 uses the procedure shown in FIG. 6A to perform the interception operations. As shown in FIG. 6A, the interceptor 411 hooks process creation and termination system calls whose caller is the descendants of root processes for container services (lines 02 and 05), uses a process ID (pid) for identifying the process of creating the container, and stores the process ID in con_process (line 03), so as to maintain a set of container-related processes responsible for container file system mounting (lines 01-06). If the system call is made by container-related processes (line 08), and the system call opens a policy file (denoted as "FILE_OPEN") (line 09) or it mounts a file system (denoted as "FILESYSTEM_MOUNT") (line 10), the interceptor 411 will obtain a container ID (cid) for each container being mounted (line 11-15). In particular, the container ID may be obtained based on the process ID of the process of creating the container 422 and a stored mapping relationship between the process ID and the container ID (line 12), or may be generated based on the process ID (pid) of the process of creating the container (line 14). If the system call (syscall) is FILE OPEN, the container ID and the policy file will be then dispatched to the parser 413 (line 16, 17), and if the system call (syscall) is FILESYSTEM_MOUNT, the container ID and the mount information will be then dispatched to the Mapper 412 (lines 18, 19).

In certain embodiments, instead of the above procedures, the interceptor 411 may be configured to detect container file system mounting using process "dockerd" under container managing system "docker" if "docker" is available for the agent 410.

After receiving the obtained container ID and mounting information of the file system of the container 422 from the interceptor 411, the mapper 412 generates a file path mapping relationship between the container 422 and the host system 410 based on the container ID and the mounting information, and stores the generated file path mapping relationship in the DB 414.

In certain embodiments, the mapper 412 may first determine a base mount point based on the container ID and the mounting information; and then generate the file path mapping relationship between the container 422 and the host system 410 based on the determined base mount point.

In certain embodiments, the file path mapping relationship generated by the mapper 412 includes the obtained container ID, a first set of container file paths of files in the file system of the container 422, and a set of host file paths of the files in the first set of container file paths, wherein the host file path is dynamically determined during the mounting of the container 422. For example, the file path mapping relationship generated by the mapper 412 may be represented in a form of <cid, HostFilePath, ContainerFilePath>, where cid (e.g., 1234 as shown in FIG. 5) is the unique ID for the container 422, ContainerFilePath is the full path for each file (e.g., /usr /bin/ls as shown in FIG. 5) in the container 422, and HostFilePath is the full path of the corresponding file (e.g., /var/123456/usr/bin/ls as shown in FIG. 5) in the host system 400 which is dynamically determined during the mounting of the container 422.

In certain embodiments, the mapper 412 uses the procedure shown in FIG. 6B to perform the mapping operation. As shown in FIG. 6B, the mapper 412 generates the file path mapping relationship between the container and the host system 400 for each mount operation, and stores the file path mapping relationship in the DB 414. In particular, the mapper 412 first finds the base mount point and save it to the DB 414 (line 06); and then generates the file path mapping relationship between the container and the host system 400 based on the base mount point (lines 07-12) and save it to the DB 414 (line 12). In certain embodiments, the information above are saved to the DB 414 as an entry of the database.

After receiving the system call of opening the policy file from the interceptor 411, the parser 413 reads the corresponding policy rule for the container from the policy file in the host (FIM policy file), and stores the policy rule to the DB 414. In certain embodiments, the parser 413 may assemble those policy rules into a policy file before storing to the DB 414, where the generated policy file is named container-based FIM policy file since it is specific to the one container, it has container file paths, and is understandable only inside the container.

The FIM policy file of the containers is a file stored on the host system 400 in advance, indicating the FIM policy of the containers defined by the user via a file structure, defining which action(s) on the files in the containers are violation actions. The FIM policy specific to the container may be represented by a list of rules which may be formalized as <file, violation>, where file refers to a file path in the container, and violation indicates an action that would break the file integrity of the file. In certain embodiments, the FIM policy file is defined by the user for at least one of the plurality of containers, i.e., the same FIM policy file may be used for different containers.

Assuming that the FIM policy file in the host system 400 includes a second set of container file paths of files in the file system of the container and violations for the files in the second set of container file paths, the parser 413 retrieves the second set of container file path, the violation of the container file path, and the associated container ID (cid) from the open policy file system call and the FIM policy file, and stores the information to the DB 414, and the stored information is accessible to the aggregator 415. Each of the violations may indicate an action that would break file integrity of each of the files in the second set of container file paths.

It may be understood that the second set of container file paths is a subset of the first set of container file paths included in the file path mapping relationship generated by the mapper 412 as previously discussed, since not all the files in the file system of the container have a corresponding FIM rule. In certain embodiments, the second set is not a subset of the first set of container file paths, but the first set and second set of container file paths have overlapped file paths.

The information retrieved by the parser 413 may be represented in a form of <cid, ContainerFilePath, Violation>, where cid (e.g., 1234 as shown in FIG. 5) is the unique ID for the container 422, ContainerFilePath is the full path for each file (e.g., /usr /bin/ls as shown in FIG. 5) in the container 422, and Violation indicates an action that would break file integrity of the corresponding file (e.g., 'write' as shown in FIG. 5).

In certain embodiments, the parser 413 uses the procedure shown in FIG. 6C to perform the parsing operation. As shown in FIG. 6C, the parser 413 may define the policy rules as <containerId=cid, type=RULE, ContainerPath, Violation>(line 02), where ContainerPath may be a full path to a file or directory inside a container while Violation indicates the action(s) that would break file integrity of the file. The parser 413 is configured to save the result to the DB 414 (lines 03-07). In certain embodiments, the result is saved to the DB 414 as an entry of the database.

After receiving the container ID, the host file path, and the corresponding container file path from the DB 414 (stored by the mapper 412) and the container ID, the container file path and the violation from the DB 414 (stored by the parser 413), the aggregator 415 is configured to generate a record, and save the record to the DB 414. In certain embodiments, the record is saved to the DB 414 as an entry of the database. The saved record is accessible by the monitor 416. As shown in FIG. 5, the record includes the container ID, the host file path, and the violation action defined for the host file path. In certain embodiments, the record is saved in a form of a configuration file. In certain embodiments, the aggregator 415 generate the record in the form of a FIM policy file, which may be termed as host-based FIM policy file because the file paths of the containers are in the form of the host file path, and is readable external to the containers.

In particular, the aggregator 415 aggregates the container ID, the first set of container file paths of files in the file system of the container and the set of host file paths of the files in the first set of container file paths included in the file path mapping relationship and the container ID, the second set of container file paths of files in the file system of the container, and the violations for the files in the second set of container file paths, so as to generate the record including the container ID, the host file paths and the violations for the host file paths. The aggregation is based on the corresponding container file path from the mapper 412 and the parser 413.

For example, the aggregator 415 may join the file path mapping relationship in a form of <cid, HostFilePath, ContainerFilePath> generated by the mapper 412 and the FIM policy rules in a form of <cid, ContainerFilePath, Violation> generated by the parser 413 using the key cid and ContainerFilePath, to generate the record in a form of <cid, HostFilePath, Violation> which can be directly used by the agent 410 on the host system 400. In the FIM policy file located inside the host and outside the containers, the container file path cannot be understood by the agent 410. Now the record include the host file path corresponding to the container file path, which is understandable by the agent 410. In certain embodiments, the aggregator 415 may assemble those policy rules into a policy file, where the generated policy file is named host-based FIM policy file since it is understandable by the agent in the host. Alternatively, the record may be inputted to the original FIM policy file to obtain an updated FIM policy file, such that the policy in the updated FIM policy file refers to the container file paths instead of the host file paths. However, due to the dynamic feature of the mounting of the container, it may be better to not updating the original FIM policy file using the policy record so that the original FIM policy is robust. Therefore, the policy record is preferably saved in a new host-based FIM policy file or arranged in other suitable format, as long as the monitor 416 can use the policy record for monitoring file integrity of the containers. In certain embodiments, the record above is saved to the DB 414 as an entry of the database.

In certain embodiments, the aggregator 415 uses the procedure shown in FIG. 6D to perform the aggregation operation. As shown in FIG. 6D, the aggregator 415 may join the results of the mapper 412 and the parser 413 using the key cid and ContainerFilePath to generate the record in the form of <Container ID, type, HostFilePath, ContainerFilePath, Violation> for the monitor 416.

As described above, the aggregator 415 is further configured to send the record (or a plurality of records) to the monitor 416. Then based on the record, the monitor 416 is configured to monitor the host file paths (corresponding to the container file paths) in real time, and achieves FIM function of the agent 410.

In particular, the monitor 416 performs the FIM on the host system 400 for the file system of the container 422, according to the host file path of the files in the first set of container file paths and the violations for the files in the second set of container file paths. In the example of FIG. 5, the monitor 416 may perform the FIM following the FIM policy record <1234, /var/123456/usr/bin/ls, 'write' >, which means that if a 'write' action on the file of the container whose container ID is '1234' and its real file path on the host is /var/123456/usr/bin/ls is detected, an alert should be issued.

In certain embodiments, instead of receiving the record from the aggregator 415, the monitor 416 may obtain a new record from the DB 414 with type=FIM and communicate with the host system 400 to monitor file integrity by e.g., registering FIM callback from OS Kernel (inotify system call in e.g. Linux), or periodically checking whether the hash value of specified file is changed.

As such, with the above processing during creating a container, the agent 410, which runs directly on the host system 400 and arranged outside the container(s), may perform the FIM for the created container(s) according to the records received from the aggregator 415 or retrieved from the DB 414, so as to link the operations of certain host file paths or files under the host file paths to the specific container. In certain embodiments, the agent 410 may also update the host-based FIM policy file using the records. In certain embodiments, the agent 410 may create a new FIM policy file using the records.

Figure 7:
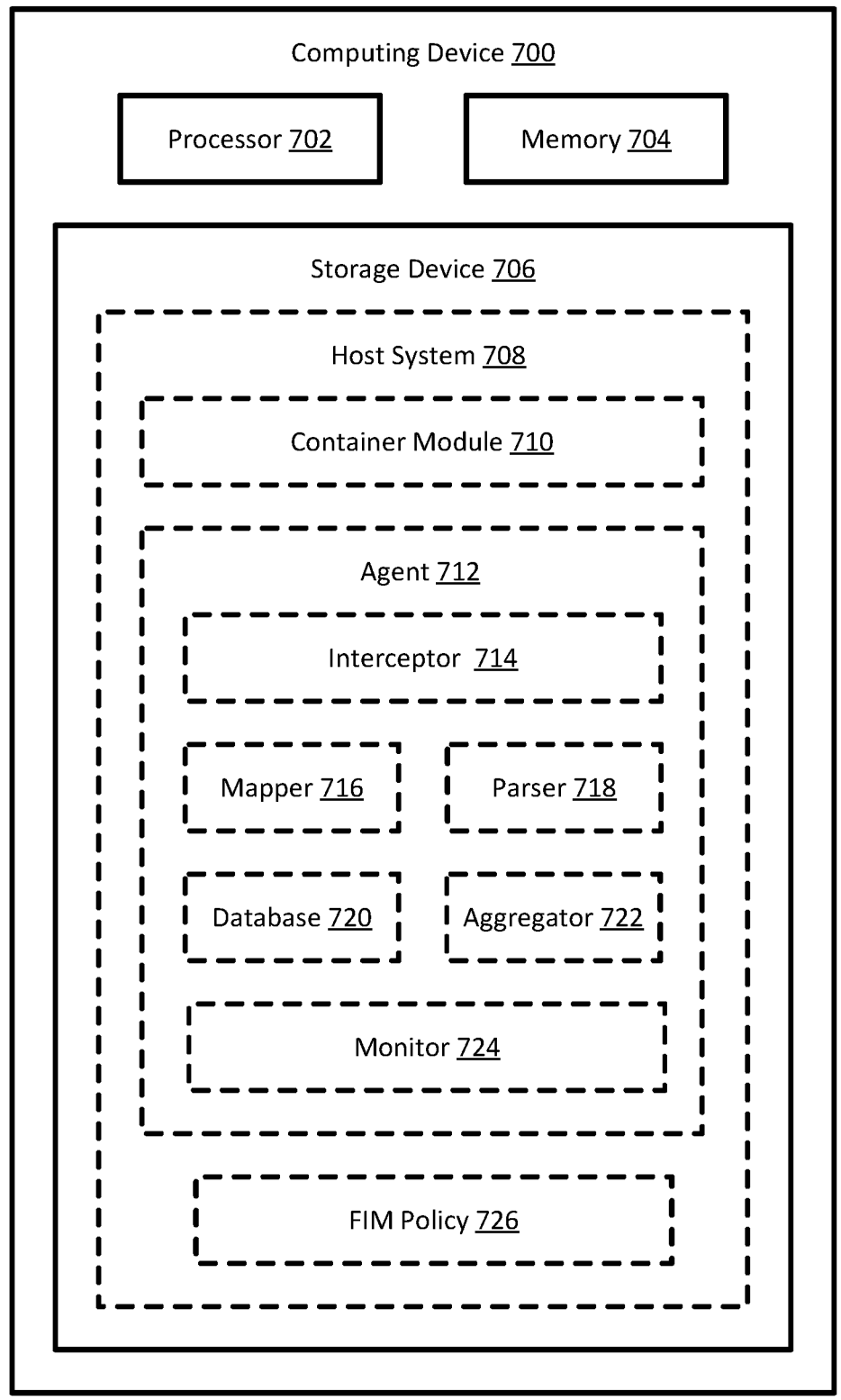
FIG. 7 schematically depicts a structure of a computing device according to a certain embodiment of the present disclosure.

FIG. 7 schematically depicts a structure of a computing device according to a certain embodiment of the present disclosure. In certain embodiments, the computing device 700 may be used for implementing the centralized FIM for a plurality of containers. In certain embodiments, the computing device 700 may be a server computer, a cluster, a cloud computer, a general-purpose computer, or a specialized computer, which can perform the centralized FIM on the plurality of containers.

As shown in FIG. 7, the computing device 700 may include, without being limited to, a processor 702, a memory 704, and a storage device 706. In certain embodiments, the computing device 700 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices. In certain embodiments, the computing device 700 is a cloud computer, and the processor 702, the memory 704 and the storage device 706 are shared resources provided over the Internet on-demand.

The processor 702 may be a central processing unit (CPU) which is configured to control operation of the computing device 700. The processor 702 can execute an operating system (OS) or other applications of the computing device 700. In some embodiments, the computing device 700 may have more than one CPU as the processor, such as two CPUs, four CPUs, eight CPUs, or any suitable number of CPUs.

The memory 704 can be a volatile memory, such as the random-access memory (RAM), for storing the data and information during the operation of the computing device 700. In certain embodiments, the memory 704 may be a volatile memory array. In certain embodiments, the computing device 700 may run on more than one memory 704.

The storage device 706 is a non-volatile data storage media for storing the OS (not shown) and other applications of the computing device 700. Examples of the storage device 706 may include non-volatile memory such as flash memory, memory cards, USB drives, hard drives, floppy disks, optical drives, or any other types of data storage devices. In certain embodiments, the computing device 700 may have multiple storage devices 706, which may be identical storage devices or different types of storage devices, and the applications of the computing device 700 may be stored in one or more of the storage devices 706 of the computing device 700. As shown in FIG. 7, the storage device 706 includes a host system 708. The host system 708 provides a platform for performing the centralized FIM on the plurality of containers.

As shown in FIG. 7, the host system 708 includes, among other things, a container module 710, an agent 712, and a FIM policy 726. The container module 710 is configured to initialize one or more containers in the host system 708. During the initialization of one of the containers, the container module 710 may mount the file paths of the container to the file paths in the host file system, and read the FIM policy 726 to define limitations of the container. The agent 712 is configured to monitor file integrity of the containers based on the FIM policy 726. The FIM policy 726 is a file containing FIM policy for the containers. The FIM policy may include an identification of a container, container file paths, and violations of the container file paths. In certain embodiments, each of the containers has a set of corresponding policy rules. In certain embodiments, the containers are classified into categories, and each category of the containers have a set of policy rules. In the above embodiments, there is only one FIM policy 726 for the agent 712. In other embodiments, each container or each category of containers has a corresponding FIM policy 726.

As shown in FIG. 7, the agent 712 includes an interceptor 714, a mapper 716, a parser 718, a database 720, an aggregator 722, and a monitor 724. In certain embodiments, the agent 712 may include other applications or modules necessary for the operation of the above modules 714-724, e.g., a database, which is omitted as a common component for not obscuring the principle of the present disclosure. Detailed description of such a host system 708 with a structure similar to that of the host system 400 in FIG. 4 may refer to the description on FIG. 4 and FIG. 5 as previously discussed. It should be noted that the modules are each implemented by computer executable codes or instructions, or data table or databases, which collectively forms one application. In certain embodiments, each of the modules may further include sub-modules. Alternatively, some of the modules may be combined as one stack. In other embodiments, certain modules may be implemented as a circuit instead of executable code.

The interceptor 714 is configured to monitor system calls of the host system 708. The system calls includes normal system calls of the host system 708 that are not related to the operation of the containers and system calls that are related to the operation of the containers. When a system call is creation or termination of a process (PROCESS_CREATION or PROCESS TERMINATION), the system call is related to the creation or termination of a process. Under this situation, the interceptor 714 is configured to check the process identification (pid) of the process. When the pid is a descendent of a container daemon, it indicates that the process is a creation of a container. In certain embodiments, the interceptor 714 is configured to label or record that pid, and stores the pid in a con_process. Later on, when a process has the pid is monitored, and the system call is FILE_OPEN and the file opened is the FIM policy 726, or the system call is MOUNT, the interceptor 714 is configured to dispatch the system calls respectively to the mapper 716 and the parser 718. In certain embodiments, the interceptor 714 is further configured to generate a container id (cid) corresponding to the pid that relates to the container, construct a pid to cid relationship, and stores the pid-cid relationship in pid_cid, such that the interceptor 714 can easily link a process with a container.

The mapper 716 is configured to, upon receiving the system call (MOUNT) from the interceptor 714, generate file path mappings between source (container) and target (host) for each mount operation and the output is stored in the database 720. Referring back to FIG. 5, each of the mappings includes container identification, the host file path that is mounted, and the container file path corresponding to the host file path.

The parser 718 is configured to, upon receiving the system call (open policy file) from the interceptor 714, define the policy rules of container file paths, and store the policy rule in the database 720. Referring back to FIG. 5, the policy rule includes container identification, the container file path, and violation of the container file path. In certain embodiments, the parser 718 may directly retrieve the container identification, the container file path, and the violation from the open policy file system call. In other embodiments, the parse 718 is configured to read the FIM policy 726 and retrieves those information from the FIM policy 726 based on the identification contained in the system call.

The aggregator 722 is configured to retrieve the file path mappings stored in the databases 720 by the mapper 716 and the policy rule stored in the database 720 by the parser 718, join the results to generate a policy record, and stores the policy record in the database 720, and the stored policy record is accessible by to the monitor 724. In certain embodiments, the aggregator 722 is configured to join the results based on the container identification of the results, where the results having the same container identification are joined if possible. In certain embodiments, the policy record includes the container identification, the host file path, and the violation. In certain embodiments, the policy record may also include the container file path. In this embodiments, the aggregator 722 is configured to retrieve the information from the database 720. In other embodiments, the database 720 is not necessary, and the aggregator 722 receives those information directly from the mapper 716 and the parser 718.

The monitor 724, in response to receiving the policy record from the aggregator 722, monitor the containers based on the policy record, and provide warnings when an operation of the host file path is a violation. In certain embodiments, the monitor 724 is configured to use the policy record directly to monitor the host system 708. In certain embodiments, the monitor 724 is configured to update the FIM policy 726 using the policy record, and monitoring the host system 708 based on the updated FIM policy 726.

Figure 8:
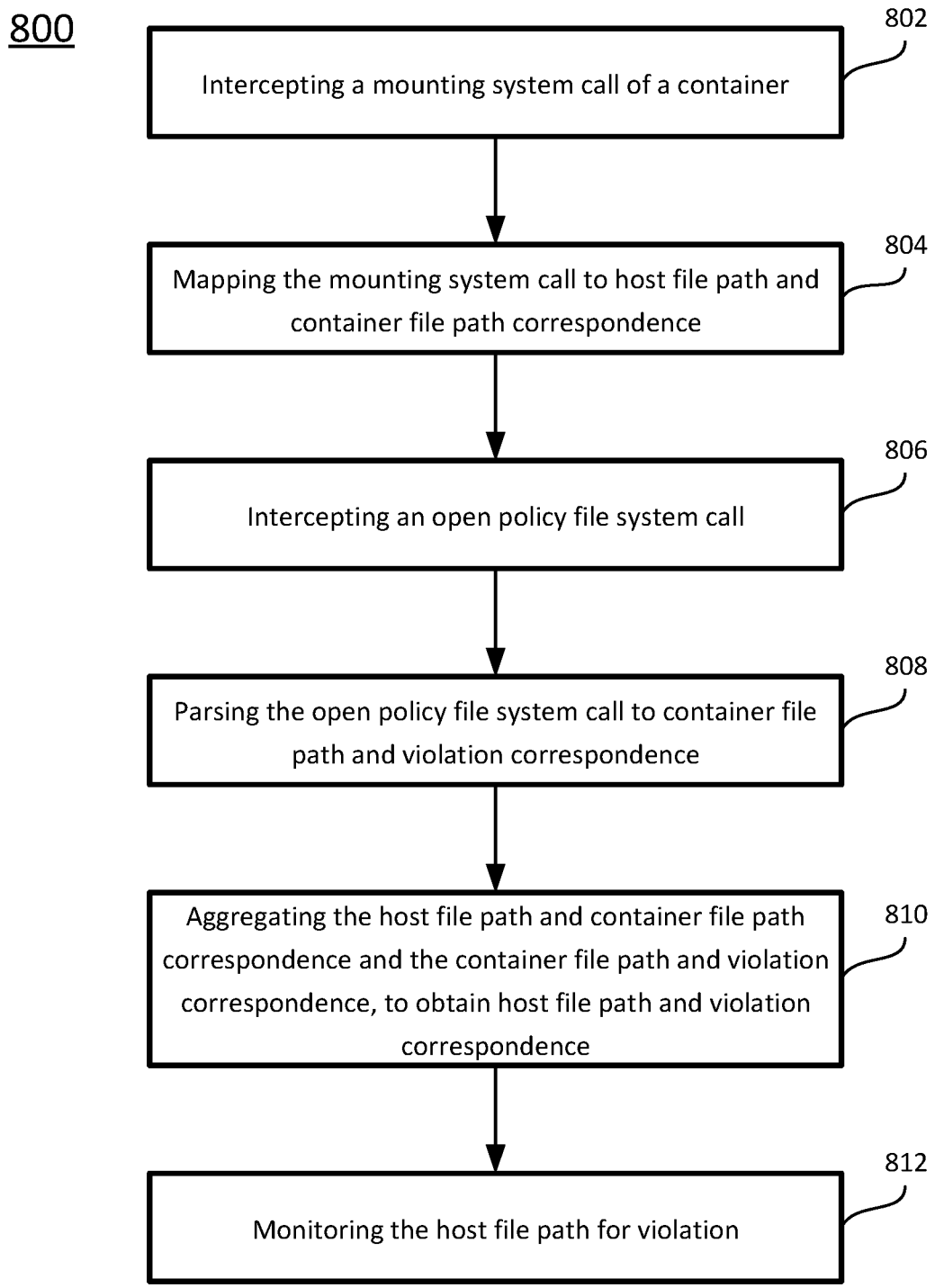
FIG. 8 schematically depicts an FIM method according to a certain embodiment of the present disclosure.

FIG. 8 depicts an FIM method 800 according to a certain embodiment of the present disclosure. In certain embodiments, the method 800 is implemented by the computing device 700 as shown in FIG. 7, and is applied to the host system 708 as shown in FIG. 7 or the host system 400 as shown in FIG. 4 for performing centralized FIM for a plurality of containers created on the host system. Hereinafter, the method 800 of FIG. 8 will be described in conjunction with the computing device 700 in FIG. 7, but it should be appreciated that the processing on the host system 708 of the computing device 700 in FIG. 7 is also applicable to the host system 400 in FIG. 4. It should be particularly noted that, unless otherwise stated in the present disclosure, the steps of the method may be arranged in a different sequential order, and are thus not limited to the sequential order as shown in FIG. 8. Some detailed description which has been discussed previously will be omitted here for simplicity.

As shown in FIG. 8, at procedure 802, the interceptor 714 monitors system calls of the host system 708, intercepts a mount system call of a container, and sends the mounting system call of the container to the mapper 716.

At procedure 804, upon receiving the mount system call, the mapper 716 generates file path mappings between the container file paths and the host file paths, and stores the mapping to the data base 720.

At procedure 806, the interceptor 7143 monitors system calls of the host system 708, intercepts a open policy file (FIM policy 726) system call, and sends the open policy file system call to the parser 718.

At procedure 808, upon receiving the open policy system call, the parser 718 defines policy rules of container file paths, and stores the policy rules in the database 720.

At procedure 810, the aggregator retrieves the mapping stored by the mapper 716 and the policy rule stored by the parser 718 in the database 720, joins the results to generate policy record, and stores the policy record in the database 720, and the stored policy record is accessible to the monitor 724. In certain embodiments, the aggregator may also send the policy record directly to the monitor 724. By joining of the two types of results, the violation for the container is directly linked to the host file path instead of being linked to the container file path.

At procedure 812, the monitor 724 monitors the operations of the host file paths for violation actions based on the policy record. The agent 712 is in operation outside the containers. Due to the isolation effect of the containers, the monitor 724 of the agent 712 is not able to see the container file paths in the containers. By the above described method, based on the policy record, the monitor 724 is able to monitor the host file paths that corresponding to the container file paths, so as to achieve monitoring of the file integrity in the containers.

Figure 9:
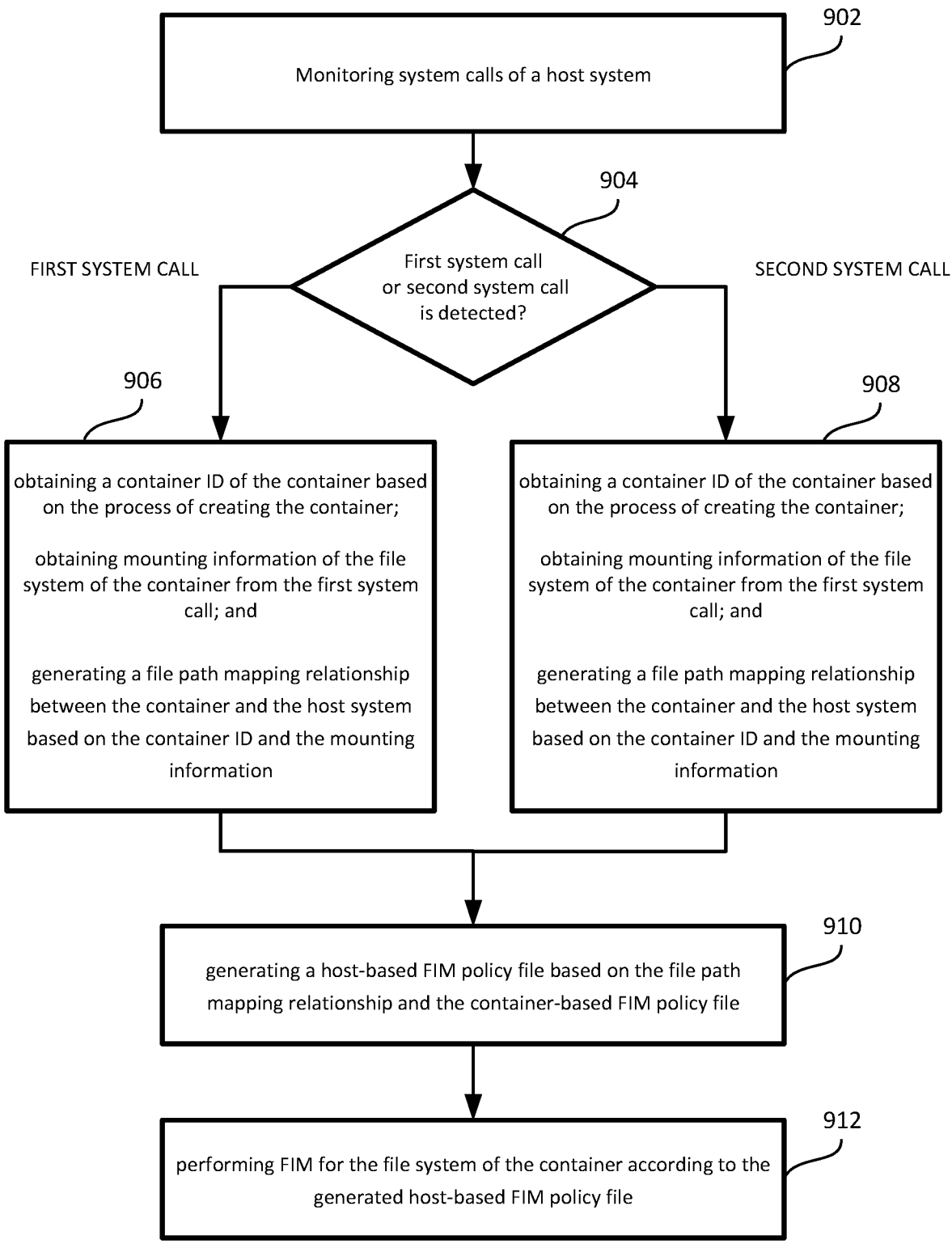
FIG. 9 schematically depicts an FIM workflow according to a certain embodiment of the present disclosure.

FIG. 9 schematically depicts an FIM workflow according to a certain embodiment of the present disclosure. In this embodiments, the policy rules and policy record described in relation to FIG. 8 are not independent rules and records, but are accomplished by updating the FIM policy 726. In certain embodiments, the agent 712 may also create a dynamic FIM policy file to store those policy records related to operating containers. When a container is created, the policy records for the container is added in the dynamic FIM policy file, and when the container is terminated, the policy records may be removed from the dynamic FIM policy file.

As shown in FIG. 9, at procedure 902, the interceptor 714 monitors system calls of the host system 708.

Since a series of system calls may be detected by the interceptor 714 upon creating a container, including not only system calls relevant to the process of creating the container, but also system calls irrelevant to the process of creating the container, the interceptor 714 determines, at procedure 904, whether a system call (also referred to as a first system call) made by the process of creating the container for mounting a file system of the container or a system call (also referred to as a second system call) made by the same process for opening an FIM policy file of the container is detected.

If the interceptor 714 determines that the first system call is detected (left branch from procedure 904, denoted "FIRST SYSTEM CALL"), the method 900 proceeds to procedure 906, in which the interceptor 714 obtains a container ID of the container based on the process of creating the container and mounting information of the file system of the container from the first system call, and sends to the mapper 716; and the mapper 716 generates a file path mapping relationship between the container and the host system 708 based on the container ID and the mounting information.

If the interceptor 714 determines that the second system call is detected (right branch from procedure 904, denoted "SECOND SYSTEM CALL"), the method 900 proceeds to procedure 908, in which the interceptor 714 obtains a container ID of the container based on the process of creating the container and sends to the parser 718, and notifies the parser 718 that the FIM policy file of the container needs to be obtained from the host system 708; and the parser 718 generates a container-based FIM policy file based on the container ID of the container and the FIM policy file obtained from the host system 708.

At procedure 906 or 908, the interceptor 714 may generate the container ID of the container based on a process ID of the process of creating the container in certain embodiments; alternatively, the interceptor 714 may obtain the container ID of the container based on a process ID of the process of creating the container and a stored mapping relationship between the process ID and the container ID.

In certain embodiments, the file path mapping relationship comprises the container ID, a first set of container file paths of files in the file system of the container, and a set of host file paths of the files in the first set of container file paths; and the container-based FIM policy file comprises the container ID, a second set of container file paths of files in the file system of the container, and violations for the files in the second set of container file paths, wherein the second set is a subset of the first set.

At procedure 910, the aggregator 722 generates a host-based FIM policy file based on the file path mapping relationship generated by the mapper 716 and the container-based FIM policy rule generated by the parser 718.

In certain embodiments, at procedure 810, the aggregator 720 aggregates the container ID, the first set of container file paths of files in the file system of the container and the set of host file paths of the files in the first set of container file paths comprised in the file path mapping relationship and the container ID, the second set of container file paths of files in the file system of the container, and the violations for the files in the second set of container file paths comprised in the container-based FIM policy file to generate the generated host-based FIM policy file including the container ID, the host file path of the files in the first set of container file paths and the violations for the files in the second set of container file paths.

At procedure 812, the monitor 722 performs FIM for the file system of the container according to the generated host-based FIM policy file. In certain embodiments, the monitor 722 performs the FIM on the host system 708 for the file system of the container, according to the host file path of the files in the first set of container file paths and the violations for the files in the second set of container file paths.

In certain embodiments, the method 800 is applied to the host system 708 for performing centralized FIM for a plurality of containers created on the host system 708, which may have benefits as follows:

The system and method of the centralized FIM for the plurality of containers according to certain embodiments of the present disclosure, among other things, have the following advantages:

(1) Less resource consumption—it achieves better resource utilization since only one agent is deployed on the host system (not replicate for each container);

(2) Easy agent management and more scalable—when the agent or policy should be updated, only the centralized agent needs to be updated to support a large number of containers; and (3) More secure FIM, since if the container is compromised by the attacker, the centralized agent in the host is still safe due to its isolation from the container namespace.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

REFERENCES

[1] http://man7.org/linux/man-pages/man7/namespaces.7.html
[2] https://www.linux-kvm.org/page/Main_Page
[3] https://www.xenproject.org/
[4] https://www.virtualbox.org/
[5] https://www.vmware.com/products/esxi-and-esx.html
[6] https://microservices.io/patterns/microservices.html
[7] https://aws.amazon.com/serverless/
[8] https://www.datamation.com/cloud-computing/aws-vs.-azure-vs.-google-cloud-comparison.html
[9] https://coreos.com/clair/docs/latest/
[10] https://docs.docker.com/engine/security/seccomp/
[11] https://cloudplatform.googleblog.com/2018/05/Open-sourcing-gVisor-a-sandboxed-container-runtime.html
[12] https://docs.docker.com/engine/security/apparmor/
[13] Secure Serverless Computing Using Dynamic Information Flow Control, Kalev Alpernas et al., https://arxiv.org/abs/1802.08984
[14] EP 2228722 B1, Kaspersky Lab ZAO, 2011.
[15] U.S. Pat. No. 7,526,516 B1, Kaspersky Lab ZAO, 2009.
[16] KR 20100125116A, 2010
[17] U.S. Pat. No. 7,457,951 B1, Hewlett-Packard Development Co LP, 2008.
[18] U.S. Pat. No. 7,069,594 B1, McAfee LLC, 2006.
[19] U.S. Pat. No. 8,819,225 B2, George Mason Research Foundation Inc., 2014.

What is claimed is:

1. A system for monitoring file integrity of a plurality of containers in a host computing device, the host computing device comprising a process and a storage device storing computer executable code, wherein the computer executable code, when executed at the processor, is configured to:
provide the containers, an agent external to the containers, and a policy file configuring policy for the containers;
intercept, by the agent, a first system call of one of the containers, the first system call indicating mounting of a container file path onto a corresponding host file path;
construct, by the agent, a first correspondence between the container file path and the host file path based on the first system call;
intercept, by the agent, a second system call of the one of the containers, the second system call indicating opening of the policy file, the policy file containing the container file path and violation corresponding to the container file path, and the violation indicating actions(s) that would break file integrity;
construct, by the agent, a second correspondence between the container file path and the violation based on the second system call;

aggregate, by the agent, the first correspondence and the second correspondence to obtain the third correspondence between the host file path and the violation of the container; and monitor, by the agent, file integrity of the container by detecting violation of the host file path in the third correspondence.

2. The system of claim 1, wherein each of the first correspondence and the second correspondence is identified with an identification of the container (cid), and the first correspondence and the second correspondence are aggregated when they have the same cid.

3. The system of claim 2, wherein the cid of the first system call is defined based on a process identification (pid) of the first system call, and the cid of the second system call is defined based on a pid of the second system call.

4. The system of claim 3, wherein at least one of the pid of the first system call and the pid of the second system call is the same as a pid of a process initializing the container.

5. The system of claim 3, wherein at least one of the pid of the first system call and the pid of the second system call is a descendant of a pid of a process initializing the container.

6. The system of claim 3, the computer executable code is further configured to:
construct a mapping between process identifications and identifications of the containers, such that a pid of a process can be converted to cid of the process based on the mapping.

7. The system of claim 1, the computer executable code is further configured to:
update the policy file using the third correspondence, and monitoring file integrity of the container using the updated policy file.

8. The system of claim 1, wherein the computer executable code is further configured to, after intercept the second system call and before construct the second correspondence: retrieve policy for the container from the policy file.

9. A method for monitoring file integrity of a plurality of containers in a host computing device, the method comprising:
providing an agent in the host computing device external to the containers and a policy file configuring policy for the containers;
intercepting, by the agent, a first system call of one of the containers, the first system call indicating mounting of a container file path onto a corresponding host file path;
constructing, by the agent, a first correspondence between the container file path and the host file path based on the first system call;
intercepting, by the agent, a second system call of the one of the containers, the second system call indicating opening of the policy file, the policy file containing the container file path and violation corresponding to the container file path, and the violation indicating action(s) that would break file integrity;
constructing, by the agent, a second correspondence between the container file path and the violation based on the second system call;
aggregating, by the agent, the first correspondence and the second correspondence to obtain the third correspondence between the host file path and the violation of the container; and
monitoring, by the agent, file integrity of the container by detecting violation of the host file path in the third correspondence.

10. The method of claim 9, wherein each of the first correspondence and the second correspondence is identified with an identification of the container (cid), and the first correspondence and the second correspondence are aggregated when they have the same cid.

11. The method of claim 10, wherein the cid of the first system call is defined based on a process identification (pid) of the first system call, and the cid of the second system call is defined based on a pid of the second system call.

12. The method of claim 11, wherein at least one of the pid of the first system call and the pid of the second system call is the same as a pid of a process initializing the container.

13. The method of claim 11, wherein at least one of the pid of the first system call and the pid of the second system call is a descendant of a pid of a process initializing the container.

14. The method of claim 11, further comprising: constructing a mapping between process identifications and identifications of the containers, such that a pid of a process can be converted to cid of the process based on the mapping.

15. The method of claim 9, further comprising: updating the policy file using the third correspondence, and monitoring file integrity of the container using the updated policy file.

16. The method of claim 9, further comprising, after intercepting the second system call and before constructing the second correspondence: retrieving policy for the container from the policy file.

17. A non-transitory computer readable medium storing computer executable code, wherein the computer executable code, when executed at a processor of a computing device, is configured to:
provide a plurality of containers, an agent external to the containers, and a policy file configuring policy for the containers;
intercept, by the agent, a first system call of one of the containers, the first system call indicating mounting of a container file path onto a corresponding host file path;
construct, by the agent, a first correspondence between the container file path and the host file path based on the first system call;
intercept, by the agent, a second system call of the one of the containers, the second system call indicating opening of the policy file, the policy file containing the container file path and violation corresponding to the container file path, and the violation indicating action(s) that would break file integrity;
construct, by the agent, a second correspondence between the container file path and the violation based on the second system call;
aggregate, by the agent, the first correspondence and the second correspondence to obtain the third correspondence between the host file path and the violation of the container; and
monitor, by the agent, file integrity of the container by detecting violation of the host file path in the third correspondence.

18. The non-transitory computer readable medium of claim 17,
wherein each of the first correspondence and the second correspondence is identified with an identification of the container (cid), and the first correspondence and the second correspondence are aggregated when they have the same cid; and
wherein the cid of the first system call is defined based on a process identification (pid) of the first system call, and the cid of the second system call is defined based on a pid of the second system call.

19. The non-transitory computer readable medium of claim 18, wherein at least one of the pid of the first system call and the pid of the second system call is the same as or a descendant of a pid of a process initializing the container.

20. The non-transitory computer readable medium of claim 19, wherein the computer executable code is further configured to: update the policy file using the third correspondence, and monitoring file integrity of the container using the updated policy file.

* * * * *